US009033267B2

(12) United States Patent
Carbonini

(10) Patent No.: US 9,033,267 B2
(45) Date of Patent: May 19, 2015

(54) DEVICE FOR GRINDING ROASTED GRAINS

(71) Applicant: RANCILIO GROUP S.P.A., Villastanza di Parabiago (MI) (IT)

(72) Inventor: Carlo Carbonini, Villastanza di Parabiago (IT)

(73) Assignee: RANCILIO GROUP S.P.A., Villastanza di Parabiago (IT)

( * ) Notice: Subject to any disclaimer, the term of this patent is extended or adjusted under 35 U.S.C. 154(b) by 0 days.

(21) Appl. No.: 14/351,257

(22) PCT Filed: Oct. 4, 2012

(86) PCT No.: PCT/IB2012/055335
§ 371 (c)(1),
(2) Date: Apr. 11, 2014

(87) PCT Pub. No.: WO2013/054238
PCT Pub. Date: Apr. 18, 2013

(65) Prior Publication Data
US 2014/0299688 A1    Oct. 9, 2014

(30) Foreign Application Priority Data

Oct. 12, 2011 (IT) .............................. TO2011A0907

(51) Int. Cl.
*B02C 21/00* (2006.01)
*A47J 42/54* (2006.01)
*A47J 42/00* (2006.01)

(52) U.S. Cl.
CPC . *A47J 42/54* (2013.01); *A47J 42/00* (2013.01)

(58) Field of Classification Search
CPC .................................. A47J 42/00; A47J 42/54

USPC ....................................................... 241/65, 66
See application file for complete search history.

(56) References Cited

U.S. PATENT DOCUMENTS

| 4,605,175 A | 8/1986 | Weber |
| 4,651,935 A * | 3/1987 | Samosky et al. ................. 241/65 |
| 4,688,727 A * | 8/1987 | Sijsling ............................ 241/56 |
| 6,095,032 A * | 8/2000 | Barnett et al. ................... 99/286 |
| 7,364,100 B2 * | 4/2008 | Pallmann ......................... 241/66 |
| 2008/0223758 A1 * | 9/2008 | Scheeres ........................... 209/3 |
| 2010/0011975 A1 | 1/2010 | Mazzer |
| 2013/0087644 A1 * | 4/2013 | Ephraim et al. ................ 241/33 |

FOREIGN PATENT DOCUMENTS

| DE | 101 47 284 A1 | 4/2003 |
| GB | 844438 A | 8/1960 |
| WO | 2009/128110 A1 | 10/2009 |

OTHER PUBLICATIONS

International Search Report for PCT/IB2012/055335 dated Feb. 12, 2013.

* cited by examiner

*Primary Examiner* — Faye Francis
(74) *Attorney, Agent, or Firm* — Sughrue Mion, PLLC

(57) ABSTRACT

A device (1) for grinding roasted grains, in particular coffee beans, of a kind including a grinding chamber (9) in which one or more electrically operated grinders grind coffee beans in order to reduce them to powder. The grinding chamber of the device is equipped with a plurality of cooling fins (29) that assist in removing heat produced during grinding, without the need to use cooling fins or similar cooling devices. Thanks to the provision of the cooling fins (28), the device (1) is inexpensive and compact and avoids an excessive increase in coffee temperature during grinding, thereby preserving the organoleptic qualities of the coffee.

22 Claims, 2 Drawing Sheets

DEVICE FOR GRINDING ROASTED GRAINS

CROSS REFERENCE TO RELATED APPLICATIONS

This application is a National Stage of International Application No. PCT/IB2012/055335 filed Oct. 4, 2012, claiming priority based on Italian Patent Application No. TO2011A000907 filed Oct. 12, 2011, the contents of all of which are incorporated herein by reference in their entirety.

TECHNICAL FIELD

The present invention relates to a device for grinding roasted grains.

More particularly, the present invention relates to a device for grinding roasted coffee beans, comprising a grinding chamber in which one or more electrically operated grinders grind the coffee beans in order to reduce them to coffee powder.

PRIOR ART

Manually operated and electrically operated devices for grinding roasted grains, in particular coffee beans, to which reference will be made hereinafter, are known and widely employed.

In particular, coffee grinding devices are known, which include a grinding chamber in which one or more electrically operated grinders—usually two grinders—grind the coffee beans. Said devices are generally referred to as "coffee grinders" or, if they comprise, downstream the grinding chamber—means for dispensing the proper quantity or dose of coffee powder required for preparing, for instance, espresso coffee, as "coffee grinders-dispensers".

In recent years, the market of coffee producers is addressing to the creation of coffee mixtures which are more and more valuable and sensitive to the conditions in which coffee is prepared, above all the temperature conditions. Indeed, temperature can cause, by its value, a "cooking" of the coffee beans and powder, and hence it can significantly act on the organoleptic qualities of the coffee beans and powder.

Hereinafter, for the sake of simplicity of description, the term "coffee" will be used for denoting both the beans and the powder, unless otherwise stated.

In order to avoid an unwanted alteration of the organoleptic qualities of the coffee, it is essential to avoid a "pre-cooking" thereof in the steps preceding its preparation, and in particular during coffee bean grinding. Thus, it is extremely important to limit the temperature increase inside the grinding chamber.

Such a temperature increase is mainly due to two factors:
heat developed because of the frictions exerted by the grinders during coffee bean grinding;
heat produced by the motor used to operate said grinders, which is typically located immediately below the grinding chamber.

In order to reduce the frictions between the grinders, conical grinders have been used in the past in place of flat grinders.

Such a measure, however, cannot dissipate or reduce heat generated by the electric motor. Moreover, use of conical grinders entails a considerable increase in the production costs and in the size of the coffee grinder or grinder-dispenser, as well as the need to use a specific motor.

Also using materials with high thermal conductivity to make the coffee grinder or grinder-dispenser—and in particular the grinding chamber—has proved insufficient to effectively remove heat and to keep the temperature increase limited.

Thus, introduction of specific devices for cooling the grinding chamber has proved necessary. Said devices can substantially be grouped into air cooling devices and water cooling devices.

Considering in particular air cooling devices, said devices generally include a cooling fan for removing hot air from the vicinity of the grinding chamber. Examples of coffee grinders-dispensers equipped with such air cooling devices are disclosed, i.a., in documents GB 844 438, US 2010/0011975 and U.S. Pat. No. 4,605,175.

Such cooling devices have however some drawbacks.

First, introducing a cooling fan and a corresponding motor entails an increase in the size and the production costs.

Moreover, if the fan is powered so as to operate only when the grinders are operating, the cooling action stops when the grinders stop and is insufficient to effectively dissipate the heat produced. On the contrary, if the fan is powered so as to be continually operating, independently of whether the grinders are operating or not, there is an unjustified consumption of electric power, besides a continuous noise that can be annoying.

It is the object of the present invention to overcome the drawbacks mentioned above of the prior art, by providing a coffee grinding device that is capable of dissipating heat produced during grinding and that is at the same time cheap and compact.

The above and other objects are achieved by means of the coffee grinding device as claimed in the appended claims.

Description of the Invention

According to the invention, the grinding chamber of the coffee grinding device is provided with a plurality of cooling fins assisting in removal of heat produced during grinding.

Surprisingly, tests and practical experiments have shown that the presence of said fins is sufficient to limit the temperature increase during coffee grinding in effective manner and so as to avoid the risk of coffee "pre-cooking".

Since, according to the invention, cooling of the grinding chamber takes place by natural circulation of air, it is possible to dispense with forced circulation cooling devices, with a resulting reduction in the size and the production costs.

Advantageously, moreover, always thanks to the fact that the cooling action takes place by natural circulation of air between the fins, such action does not entail electric power consumption and is constant and independent of the operating modalities of the grinders.

Moreover, contrary to the prior art devices including a cooling fan, cooling by means of natural circulation of air in the device according to the invention does not generate any noise.

BRIEF DESCRIPTION OF THE FIGURES

Further features and advantages of the invention will become apparent from the following description of a preferred embodiment, given by way of non limiting example, with reference to the accompanying drawings, in which.

DESCRIPTION OF A PREFERRED EMBODIMENT

Figure 1:
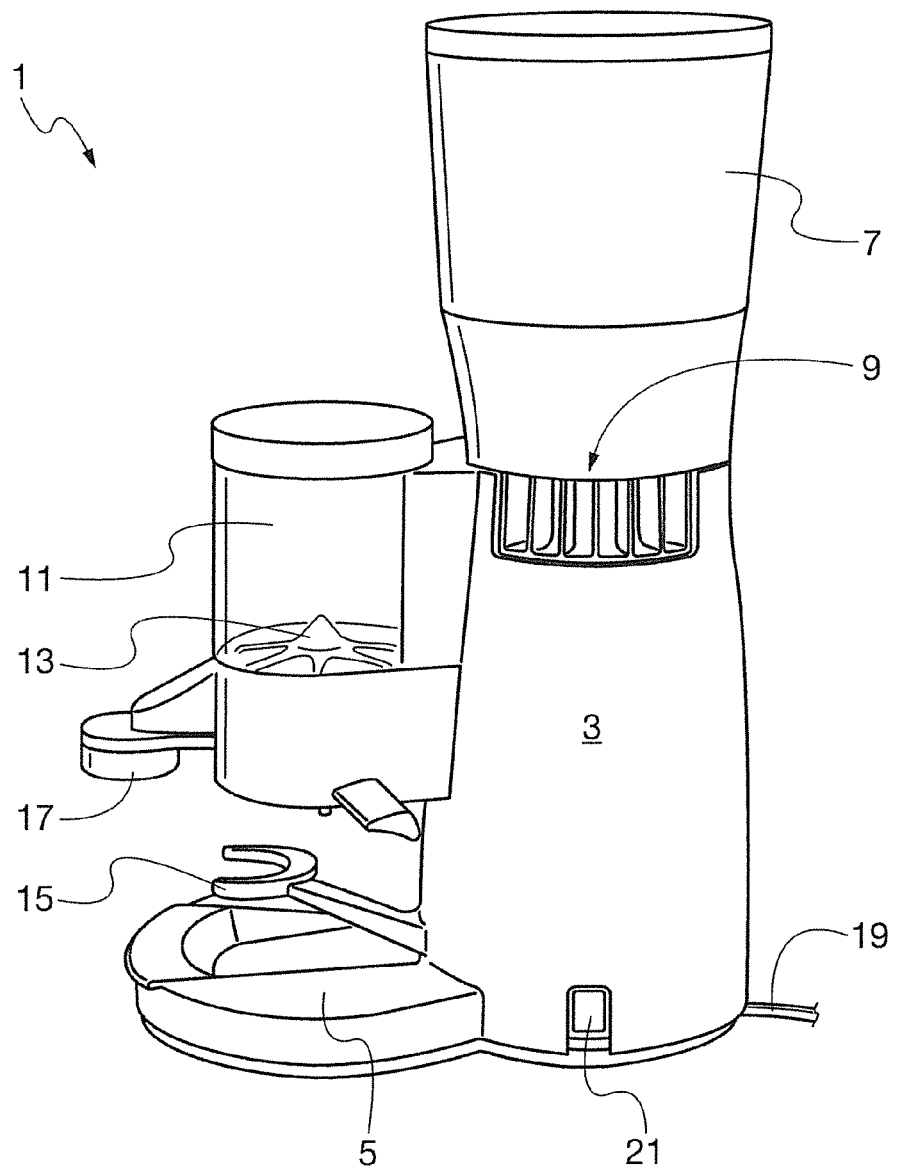
FIG. 1 is a schematic side view of a coffee grinding device according to the invention.

Referring to FIG. 1, there is shown a coffee grinding device 1 according to a preferred embodiment of the invention.

Figure 3:
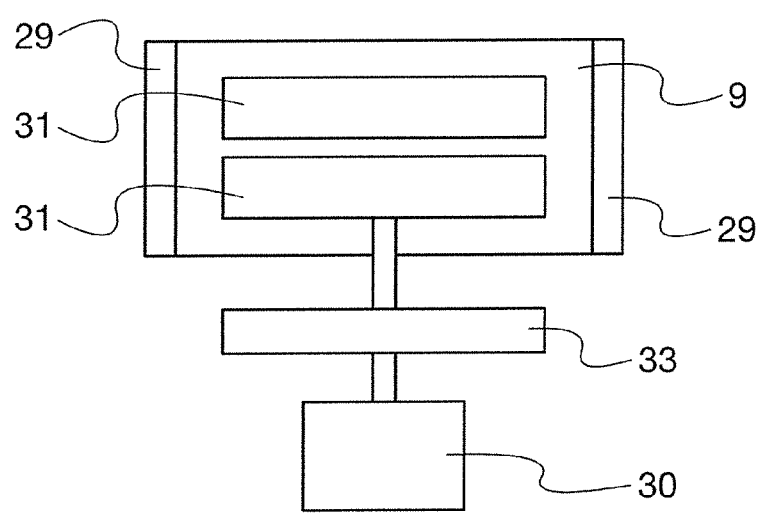
FIG. 3 is a schematic block diagram of a device for grinding roasted grains.

Coffee grinding device (coffee grinder) 1 comprises a case 3 mounted on a support 5. Case 3 includes, in its upper portion, a container 7 for the coffee beans, which can be transferred by gravity to grinding chamber 9. One or more grinders 31 (FIG. 3) are provided inside grinding chamber 9 and mutually cooperate so as to grind coffee beans coming from container 7 and to reduce them to coffee powder.

Two grinders 31 are preferably provided and, as mentioned above, they can be flat grinders or conical grinders.

Said grinders 31 are operated by an electric motor 30 contained inside case 3, near grinding chamber 9 and preferably immediately below said grinding chamber 9.

As it will be disclosed in more detail below, ground coffee powder is transferred from grinding chamber 9 to a second container 11, always by gravity.

Dosing means 13, known per se, are provided on the bottom of said second container 11 and they allow dispensing a proper amount of coffee required for preparing, for instance, espresso coffee to a filter holder.

To this end, coffee grinder 1 may include a supporting arm 15 for the filter holder arranged below dosing means 13 in the second container 11, and a pressing element 17 in order to press the coffee powder inside said filter holder before preparing coffee.

FIG. 1 also shows a cable 19 connecting the electric motor of coffee grinder 1 to the electric mains and a switch 21 to start/stop said electric motor.

Figure 2:
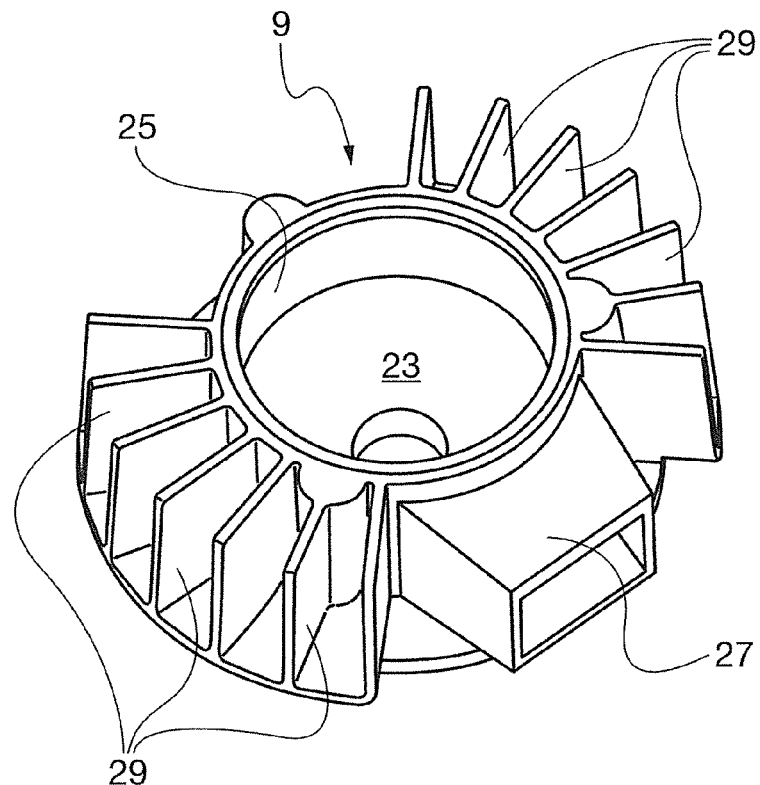
FIG. 2 is a schematic perspective view of the grinding chamber of the device shown in FIG. 1.

Grinding chamber 9 of coffee grinder 1 according to the invention is shown in greater detail in FIG. 2, where the grinders are not shown for the sake of simplicity.

Grinding chamber 9 is a substantially cylindrical chamber, defined by a bottom 23 and a side wall 25. A discharge duct 27, preferably inclined downwards, is provided along said side wall 25 in order to transfer the coffee powder from grinding chamber 9 to the second container or container 11 for the coffee powder.

In order to limit the temperature increase of the coffee during grinding, case 3, and more particularly grinding chamber 9, of coffee grinder 1 are made of a material with high thermal conductivity, in particular a metal. Preferably, the material employed is aluminum, but also other materials with high thermal conductivity (e.g. brass, copper etc.) can be employed as well.

According to the invention, in order to further increase dissipation of heat produced during grinding of the coffee beans and to thereby reduce the temperature increase of the coffee beans and the coffee powder during such phase, a plurality of cooling fins or ribs 29 are provided along lateral surface 25 of grinding chamber 9.

The provision of such cooling fins considerably increases the heat exchange surface between grinding chamber 9 and the surrounding environment, thus assisting in dissipating heat produced during grinding.

Like grinding chamber 9, also cooling fins 29 are made of a material with high thermal conductivity, such as brass, copper etc. or more preferably aluminum.

Preferably, such cooling fins 29 are vertically directed, i.e. they are parallel to the longitudinal axis of grinding chamber 9, so as to favour air circulation by natural convection (by exploiting the so-called "chimney effect") and, consequently, to favour cooling of grinding chamber 9 and of the coffee contained therein.

Said cooling fins are preferably distribute so as to be equally spaced from each other, and they may be arranged along the whole lateral surface 25 of grinding chamber 9 or only on one or more portions thereof.

The number of cooling fins 29 can be chosen so as to optimise dissipation of heat produced: on the one side, by increasing the number of cooling fins, the heat exchange surface is increased; on the other side, the number of cooling fins cannot be increased beyond a certain limit since the spacing between two subsequent cooling fins should be sufficiently great to ensure an adequate air flow between said fins.

On the basis of such factors, and taking into account the geometry of grinding chamber 9, it is possible to determine the optimal number of cooling fins for each case.

For instance, in case of a grinding chamber 9 with standard size, e.g. with a surface about 45 mm high, with an external diameter of about 100-110 mm, e.g. 107 mm, and taking into account that by experimental tests it has been determined that the spacing between two consecutive cooling fins 29, in correspondence of the diameter, should be at least 5 mm, and more preferably about 10 mm, it is possible to have 20 to 25 cooling fins projecting from the whole grinding chamber surface, or a lower number, e.g. about 15 to 18 fins, if the fins are arranged only on one or more portions of said surface.

The extension, in radial direction, of cooling fins 29 is the result of a trade off between the wish to increase as much as possible the heat exchange surface and the need to keep the overall size of coffee grinder 1 limited. For the grinding chamber of the above example, said radial length can advantageously be 20 mm to 30 mm, preferably about 25 mm.

Preferably, the height of cooling fins 29 is substantially the same as that of grinding chamber 9 and, in the example considered, is about 45 mm.

The thickness of cooling fins 29 is preferably as small as possible, so that, for a given number of cooling fins, the spacing between two subsequent cooling fins is high and air circulation is favoured. Yet, reduction of the thickness of said cooling fins 29 is limited by reasons of structural strength and working complexity. Cooling fins 29 are preferably less than 5 mm thick and preferably are about 3 mm thick. It will be however evident for the skilled in the art that the thickness of such cooling fins will considerably depend on the material employed.

Experimental tests have shown that the provision of cooling fins 29 allows limiting the temperature increase during coffee grinding in effective manner and so as to avoid the risk of coffee "pre-cooking".

In particular, coffee grinder 1 according to the invention has been tested several times, in periods of the overall duration of 30 min, according to a working cycle providing for the alternation of an operation phase of grinders 31 over 35 sec, followed by a pause phase of 15 sec, at an ambient temperature of 22° C.±2° C.

The same test has been performed under the same conditions on a coffee grinder having the same geometrical characteristics, the same motor and the same grinders as coffee grinder 1, but lacking the cooling fins.

The results of said test are shown in the following table:

|  | Coffee grinder with fins | Coffee grinder without fins | ΔT |
|---|---|---|---|
| Coffee temperature at the end of the test, measured in duct 27 | 41.8° C. | 49.6° C. | −7.8° C. |
| Temperature of the grinding chamber at the end of the test, measured at mid height of wall 25 | 44.5° C. | 52.6° C. | −8.1° C. |

The above results clearly show that the provision of cooling fins 29 allows effectively reducing the coffee temperature increase during the grinding phase, thereby allowing preserving the organoleptic qualities of the coffee itself.

At the same time, coffee grinder 1 according to the invention equipped with cooling fins 29 will have the same size, the same consumption and the same noisiness as the coffee grinder lacking the cooling fins.

It is therefore clear that the invention allows fully achieving the aim set forth above, by providing a coffee grinder that is cheap, compact and effective in maintaining the coffee temperature during grinding limited.

Moreover, it is clear that what has been described and shown has been given by way of non limiting example and that several changes and modifications are possible without thereby departing from the scope of the invention as defined by the appended claims.

In particular, even if in the embodiment described above reference has been made to a medium-size model of coffee grinder, the present invention can be adapted also to coffee grinder models of different sizes, e.g. sizes variable within ±15-20% with respect to the coffee grinder considered here by way of non limiting example, without thereby departing from the scope claimed here.

Even though the description specifically refers to coffee grinders, a skilled in the art will readily understand that the description can be however applied to coffee grinders-dispensers, which, downstream the grinding chamber, comprise or are associated with means for dispensing the proper quantity or dose of coffee powder required for preparing, for instance, espresso coffee.

Moreover, in particular, even if in the embodiment described above, cooling of the grinding chamber is wholly carried out by means of natural air circulation between the cooling fins, a skilled in the art will readily understand that it would also be possible to provide a fan 33 connected to the electric motor so as to obtain a further reduction of the coffee temperature at the exit from the grinding machine by means of an additional cooling component, e.g. an air cooling component operating by means of forced air circulation.

The invention claimed is:

1. A device for grinding roasted beans comprising
   a case comprising a container for said roasted beans, and
   a grinding chamber connected to the container, said grinding chamber having a cylindrical shape, and comprising one or more grinders, the one or more grinders are one or more flat grinders or one or more conical grinders, said grinders configured for grinding the roasted beans; wherein
   the container and the grinding chamber arranged so that said roasted beans are transferred to the grinding chamber by gravity,
   said grinding chamber comprises along a lateral surface of said grinding chamber, a plurality of vertically oriented ribs parallel to a longitudinal axis of said grinding chamber,
   said ribs arranged to cool the grinding chamber by natural air convection.

2. The device according to claim 1, wherein said ribs are made of a high thermal conductivity material.

3. The device according to claim 2, wherein the longitudinal axis of said grinding chamber extends in a vertical direction.

4. The device according to claim 3, wherein spacing between two adjacent ribs is higher than 5 mm.

5. The device according to claim 3, wherein a length in radial direction of said ribs is between 20 mm and 30 mm.

6. The device according to claim 3, wherein a thickness of each of said ribs is less than 5 mm.

7. The device according to claim 2, wherein said grinding chamber has a height in a vertical direction that is smaller than an external diameter of said grinding chamber.

8. The device according to claim 7, wherein a height in a vertical direction of said ribs is equal to a height in vertical direction of said grinding chamber.

9. The device according to claim 1, wherein said ribs are made of a metal selected from the group consisting of
   aluminium,
   copper,
   brass.

10. The device according to claim 9, wherein the longitudinal axis of said grinding chamber is arranged in a vertical direction.

11. The device according to claim 10, wherein spacing between two adjacent ribs is higher than 5 mm.

12. The device according to claim 9, wherein said grinding chamber has a height in a vertical direction that is smaller than an external diameter of said grinding chamber.

13. The device according to claim 12, wherein a height in a vertical direction of said ribs is equal to a height in vertical direction of said grinding chamber.

14. The device according to claim 1, wherein the longitudinal axis of said grinding chamber extends in a vertical direction.

15. The device according to claim 14, wherein said ribs are arranged evenly spaced from one another.

16. The device according to claim 14, wherein spacing between two adjacent ribs is higher than 5 mm.

17. The device according to claim 14, wherein a length in radial direction of said ribs is between 20 mm and 30 mm.

18. The device according to claim 14, wherein a thickness of each of said ribs is less than 5 mm.

19. The device according to claim 1, wherein said grinders of said grinding chamber are operated by an electric motor, arranged near said grinding chamber.

20. The device according to claim 19, further comprising a fan operated by said electric motor arranged to force air circulation.

21. The device according to claim 1, wherein said grinding chamber has a height in a vertical direction that is smaller than an external diameter of said grinding chamber.

22. The device according to claim 21, wherein a height in a vertical direction of said ribs is equal to a height in vertical direction of said grinding chamber.

* * * * *